United States Patent
Reed et al.

(10) Patent No.: US 7,328,017 B2
(45) Date of Patent: Feb. 5, 2008

(54) RESOURCE NEGOTIATION IN WIRELESS COMMUNICATIONS NETWORKS AND METHODS

(75) Inventors: John D. Reed, Arlington, TX (US); Hao Bi, Wheeling, IL (US)

(73) Assignee: Motorola, Inc., Schaumburg, IL (US)

(*) Notice: Subject to any disclaimer, the term of this patent is extended or adjusted under 35 U.S.C. 154(b) by 638 days.

(21) Appl. No.: 10/662,256

(22) Filed: Sep. 15, 2003

(65) Prior Publication Data
US 2005/0059407 A1    Mar. 17, 2005

(51) Int. Cl.
*H04Q 7/20* (2006.01)

(52) U.S. Cl. .............. 455/436; 455/428; 455/434; 455/560; 455/442; 455/553.1; 455/438; 370/335; 370/336; 370/460; 370/468

(58) Field of Classification Search ........... 455/436, 455/426.1, 442, 434, 552.1; 370/335, 336, 370/315, 468

See application file for complete search history.

(56) References Cited

U.S. PATENT DOCUMENTS 6,504,827 B1* 1/2003 Kuo et al. ............. 370/329
6,937,861 B2* 8/2005 Vanghi ................. 455/436

* cited by examiner

*Primary Examiner*—Joseph Feild
*Assistant Examiner*—Randy Peaches
(74) *Attorney, Agent, or Firm*—Roland K. Bowler, II

(57) ABSTRACT

A method in wireless communications networks including transmitting a radio resource assignment (520) to a wireless communications device in response to a request (510), transmitting radio resource assignment time-out information to the wireless communications device, for example, in the assignment message (520), wherein the radio resource assignment time-out information specifies a duration during which the radio resource assignment to the wireless communications device remains valid after the wireless communications device discontinues communication on the radio resource assigned.

20 Claims, 4 Drawing Sheets

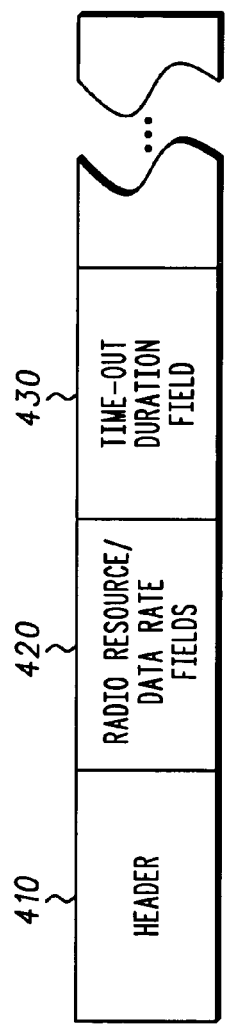
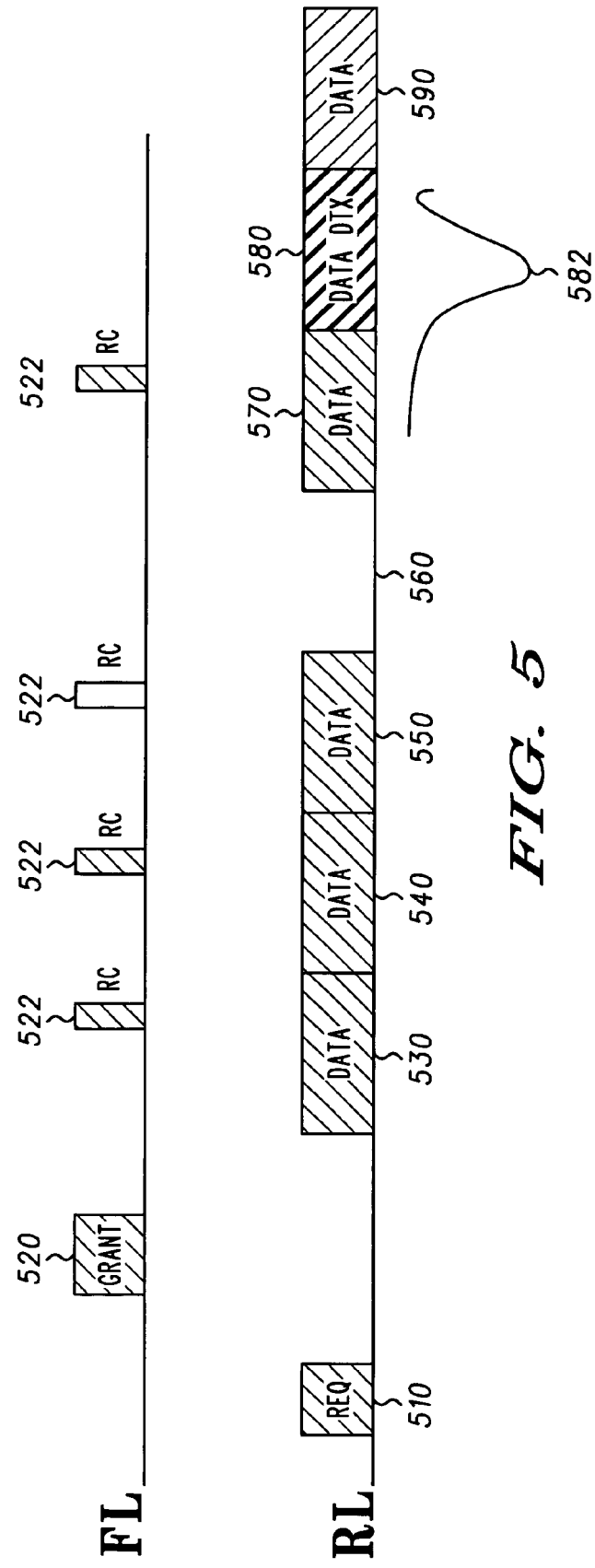
FIG. 4
FIG. 5

RESOURCE NEGOTIATION IN WIRELESS COMMUNICATIONS NETWORKS AND METHODS

FIELD OF THE DISCLOSURE

The present disclosure relates generally to wireless communications, and more particularly to radio resource negotiation in wireless communications networks, for example, data channel requests and assignments in cellular communications networks, and methods.

BACKGROUND OF THE DISCLOSURE

In wireless data networks, mobile stations must generally request a data channel assignment before transmitting data. In the CDMA 2000 protocol, for example, the mobile station (MS) requests a data channel assignment by sending a Supplemental Channel Request Message (SCRM) to the network indicating how much data the MS has in its buffer. The channel assignment message from the network in the CDMA 2000 protocol is a Supplemental Channel Assignment Message (SCAM) or an Enhanced Supplemental Channel Assignment Message (ESCAM), which includes more information. The E/SCAM includes a scheduling period over which the MS may transmit data at an assigned data rate. In the existing CDMA 2000 protocol, the data channel request and assignment messaging occurs at Layer 3 in the architecture.

In the $3^{rd}$ Generation Partnership Project 2 (3GPP2), Technical Specification Group C (TSG-C) Work Group 3 (WG3) has proposed an alternative data scheduling and rate control scheme including overhead channels that may replace the existing E/SCAM. In prior art FIG. 1, under the WG3 proposal, in response to a request message 110 from the MS on the reverse link (RL), the network transmits a scheduling (grant) message 120 on a forward link (FL) Grant Channel (F-GCH). The grant message assigns a data rate, e.g. 76.8 kbits/s, for the MS to transmit one encoder packet. Thereafter, upon successfully transmitting the encoder packet, the MS may continue to transmit data subject to a rate control command sent by the network on the forward link. The rate control command permits the network to adjust the data rate up or down one step at a time, e.g., 1 bit per 10 ms frame. The rate control command is sent prior to the frame whose rate it will control. In FIG. 1, the rate control command (RC) 130 sent during frame 140 controls the rate on future frame 142, RC 132 sent during frame 142 controls the rate of frame 144, etc. In the proposed scheme, the data rate may be maintained from one frame to the next.

An alternative proposal by 3GPP2 TSG-C WG3 is a modified grant message having an additional bit to disable the rate control command after transmitting one encoder packet. The effect of disabling the rate command enables the network to limit the data channel assignment to the one encoder packet. Thus, the MS must request a new data channel assignment for transmitting packets in addition to the original encoder packet.

In the existing CDMA 2000 data channel assignment protocol, the channel assignment is for a fixed period starting at a specified time. In the TSG-C WG3 proposals discussed above, the channel assignment is lost when there is a gap in transmission. FIG. 1 illustrates loss of the channel assignment upon completion of the transmission of data in frame 144, e.g., when the MS buffer is emptied, or upon discontinuous transmission (DTX), e.g., for lack of sufficient transmission power due to channel fading. In FIG. 1, data transmission resumes in frame 146 only upon receipt of a new grant 122 in response to a new request 112 transmitted by the MS on the reverse link. Cumulative channel assignment negotiation generally has an adverse impact on reverse and forward link capacity and may result latency. The CDMA 2000 protocol permits the MS to transmit data without a channel assignment, but the data rate is relatively low, on the theory that the network has inadequate forewarning, which is necessary to allocate resources to accommodate the transmission.

The various aspects, features and advantages of the disclosure will become more fully apparent to those having ordinary skill in the art upon careful consideration of the following Detailed Description thereof with the accompanying drawings described below.

BRIEF DESCRIPTION OF THE DRAWINGS

FIG. 4 is an exemplary radio resource assignment message.

FIG. 5 is an exemplary radio resource request and usage scheme.

DETAILED DESCRIPTION

Figure 1:
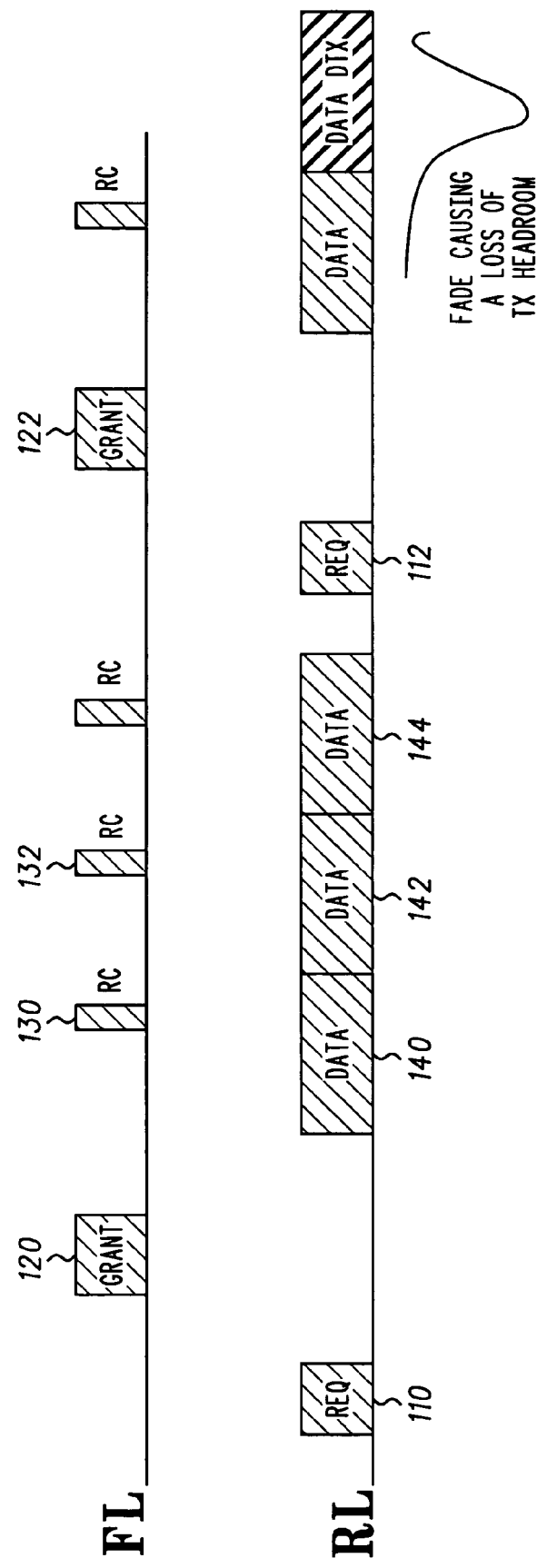
FIG. 1 illustrates a prior art data channel request and usage scheme.
Figure 2:
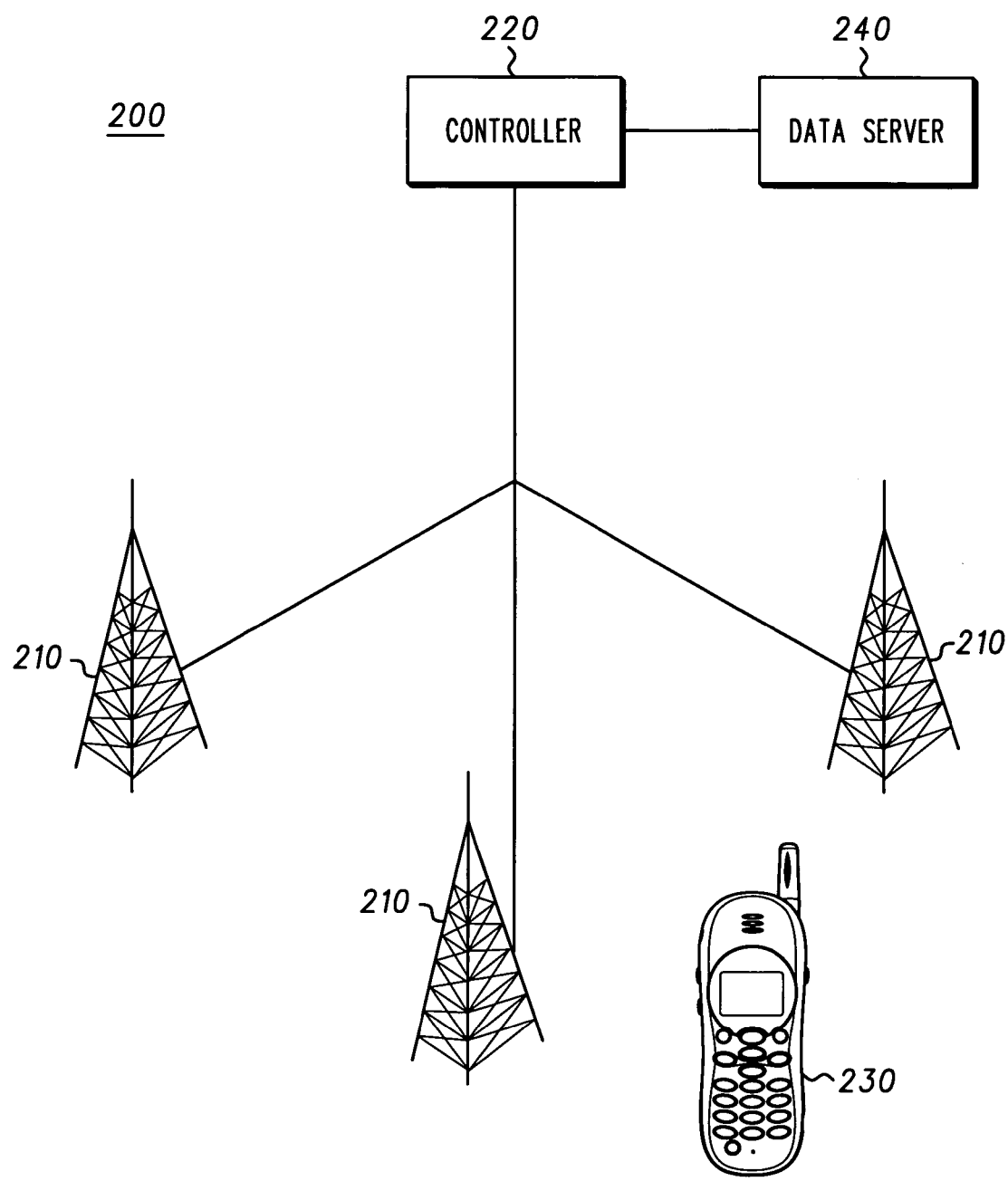
FIG. 2 illustrates an exemplary wireless communications network.

FIG. 2 is an exemplary wireless communications network 200 comprising a plurality of base stations 210 communicably coupled to a controller 220. A wireless communications device 230 communicates with others devices via one or more base stations when connected to the network. The exemplary network 100 is also coupled to a data server 240, usually by a gateway not illustrated but known in the art, thus providing data services to wireless communications devices in the network. In one embodiment, the wireless communications network is a CDMA 2000 network, although in other embodiments the network conforms to some other communications protocols, for example, $3^{rd}$ Generation Partnership Project (3GPP) Universal Mobile Telephone System (UMTS) wireless communications W-CDMA communications systems, among others.

Generally, the communications network allocates radio resources to wireless communications devices in the network. In FIG. 2, for example, one of the base stations 210 serving the wireless communications device 230 assigns radio resources, for example, a data channel assignment and possibly a data rate, to the wireless communications device 230. In some embodiments, the radio resource assignment is made in response to a radio resource request from the wireless communications device, although in other embodiments the request may be implied rather than explicit.

Figure 3:
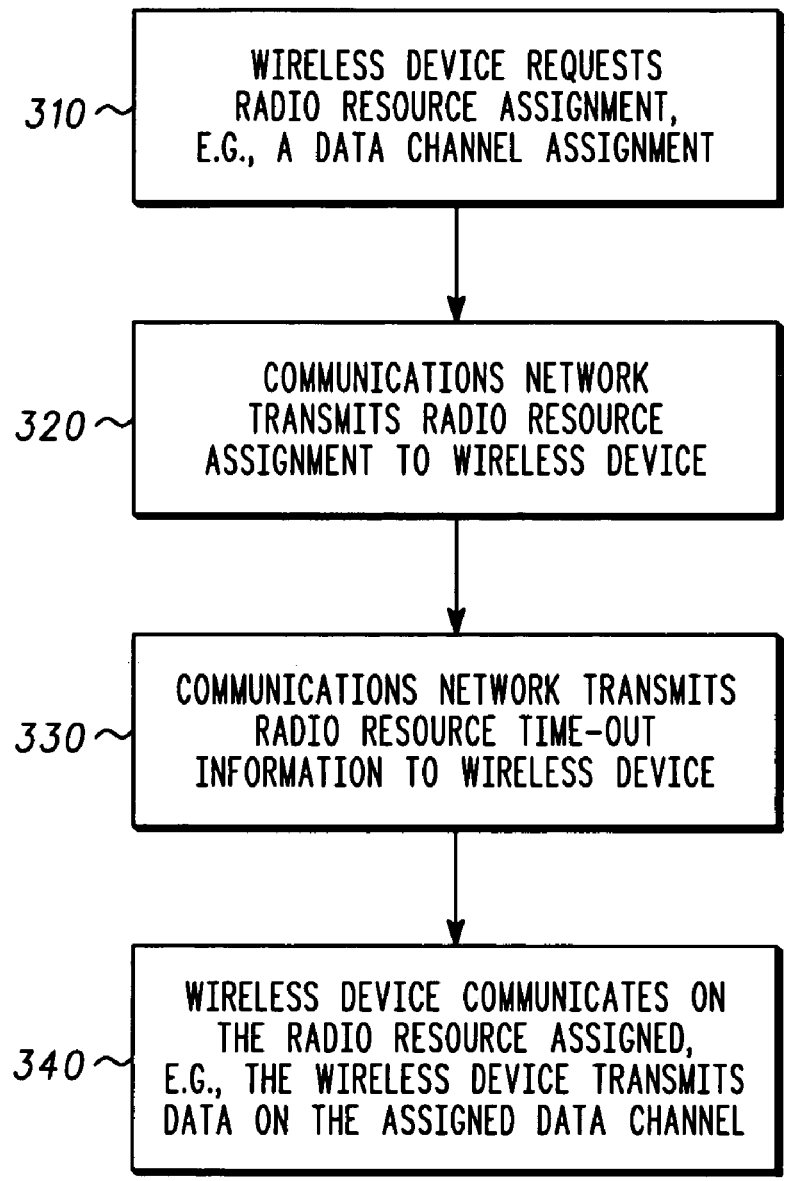
FIG. 3 is an exemplary process diagram.

In the exemplary process diagram 300 of FIG. 3, at block 310, a wireless communications device requests a radio resource assignment, for example, a data channel assignment, a dedicated resource, etc. As suggest above, the radio resource assignment request may be implied. In the schematic communications diagram 500 of FIG. 5, the wireless device transmits a request 510 to the network on the reverse link (RL) in the exemplary CDMA 2000 application. In other communications protocols the link on which the wireless device communicates is known by another name, for example, an "uplink" in some WCDMA wireless communications protocols.

In FIG. 3, at block 320, the communications network transmits a radio resource assignment to a wireless communications device, usually but not necessarily, in response to a radio resource assignment request. In one embodiment, the radio resource assignment is communicated to the wireless communications device in a radio resource assignment, or grant, message, discussed further below. In FIG. 5, the network responds to the radio resource request 510 with a radio resource grant 520 on the forward link (FL), also referred in some communications protocols as a "downlink".

FIG. 4 illustrates an exemplary radio resource assignment message 400 including, in some embodiments, a header portion 410, and a radio resource assignment portion 420, for example, an encrypted data bit field. In the exemplary embodiment where the radio resource assignment is a data channel assignment, the assignment message 400 may include, in at least some embodiments, a data rate, or related parameter, assignment field. In FIG. 4, the data rate assignment is also specified in data field 420 of the message. In other embodiments where the message includes a data rate, the data rate may be encoded in a separate field. The format of the exemplary message in FIG. 4 is not specific to any particular communications protocol, and is not intended to be limiting. The radio resource assignment and any data rate assignment information included in the message will generally be defined or encoded pursuant a particular communications messaging protocol.

In some embodiments of the disclosure, the network also transmits radio resource assignment time-out information to the wireless communications device, as illustrated at block 330 in FIG. 3. In one embodiment, the radio resource assignment time-out information specifies a duration during which the radio resource assignment to the wireless communications device remains valid after the wireless communications device discontinues communication on the assigned radio resource. The resource assignment is invalid after the time-out period.

In one embodiment, illustrated in FIG. 4, the radio resource time-out information is included in a time-out duration field 430 in the radio resource assignment message 400, along with the channel and any data rate assignment. Thus radio resource assignment and the radio resource time-out information may be transmitted to the wireless device concurrently in the same message. In other embodiments, however, the radio resource assignment and the time-out information may be transmitted to the wireless device in separate messages. In the exemplary CDMA 2000 application, for example, the channel assignment may be communicated in a radio resource assignment message and the time-out information may be communicated separately in a Layer 3 message.

In one embodiment, the radio resource assignment time-out information is one of a plurality of time-out durations or intervals defined or encoded by one or more bits communicated to the wireless communications device. Generally, the network selects the radio resource time-out interval as a function of one or more variables. In one embodiment, for example, the interval is based on system load and/or load variability. That is, the more load room in the system and the slower the load changes, the larger the grant time-out value. In another embodiment, the radio resource time-out interval is based on the amount of reserve power, or headroom, at the wireless communications device. Alternatively, the interval may be based on the type of traffic and/or quality of service (QoS). For example, subscribers with a higher quality of service may be provided a longer time-out interval to allow more time to wait for a packet before removing the radio resource assignment.

In embodiments, where the radio resource time-out interval is defined by a single bit, the time-out interval may assume one of two different values, for example, a default duration interval and a zero duration. In another embodiment where the time-out period is defined by a single bit, the time-out period assumes a default value that remains fixed in one bit state and in the other bit state the time-out value assumes a default value that is or may be updated by another message, for example, by a Layer 3 message.

Table I below illustrates another particular example.

TABLE I

| 1 Bit | Function |
|---|---|
| 0 | Grant Expires after the MS transmits one frame. |
| 1 | Grant Expires after a gap (time-out time) of X frames, where X is specified by a L3 message. |

In Table I, when the time-out bit is set to "0" the radio resource grant expires after the MS transmits a single frame. According to this scheme, with reference to FIG. 5, the radio resource assignment assigned in grant 520 expires upon completion of the transmission of frame 530 when the time-out bit is set to "0" as in Table I.

In Table I, when the time-out bit is set to "1", the time-out duration is set to some default value and the time-out period begins when the wireless communications device discontinues communication on the radio resource, for example, upon discontinuing transmission (DTX) or when the data buffer is emptied. Thus when the time-out bit is set to "1", the radio resource assignment is valid so long as transmission gaps do not exceed the radio resource time-out period. In another embodiment, one or more time-out period values may be stored at the wireless device, and selected when the time-out bit is set to "1", wherein the selection is based on system parameters, as described above.

Alternatively, the radio resource time-out interval may be defined by 2 or more bits mapped to a practical range of time-out intervals as illustrate in Table II below. The exemplary time-out period begins when the wireless device terminates communication, for example, discontinues transmission.

TABLE II

| 2 Bits | Function |
|---|---|
| 00 | 1 Frame (approximately 10 ms/frame) |
| 01 | 4 Frames |
| 10 | 8 Frames. |
| 11 | 16 Frames. |

According to Table II, when the time-out bits are set to "00", the MS must resume communication on the assigned radio resource within 1 frame period. When the time-out bits are set to "01", the MS must resume communication on the assigned radio resource within 4 frame periods, etc. With 3 bits, the range could be extended to 256 frames. Other values could also be used alternatively.

In FIG. 3, at block 340, the wireless device communications communicates on the radio resource assigned by the network in the radio resource assignment, for example, the wireless device transmits data on the assigned data channel at the assigned data rate.

In FIG. 5, assuming that the time-out interval is greater than 1 frame, the radio resource assignment assigned by grant 520 remains valid during the frame interval 560 during which transmission is interrupted, for example, due to a data gap, after transmitting data in frames 530, 540 and 550. The wireless device is able to resume transmission of data in frame 570, after the interval 560, without requesting a new radio resource assignment, since the frame interval 560 is less than the radio resource time-out interval. Similarly, the wireless device is able to resume sending data in frame 590 after a fading 582 induced transmission interruption in frame 580 without requesting a new radio resource assignment, provided the DTX interval 580 is less than the time-out interval. In either case, of the transmission discontinuity 560 or 580 is greater that the time-out interval, the wireless device must request a new radio resource assignment before resuming the transmission of frames 570 and 590.

In one embodiment, the data rate at which communications are resumed, in the absence of requesting a new radio resource assignment, is not more than the rate at which communications last occurred. In FIG. 5, for example, rate at which transmission resumes in frames 570 and 590 does not exceed the data rate in previous frames 550 and 570, respectively.

The use of a radio resource time-out interval enables the network to automatically remove a radio resource assignment when the wireless device to which the resource was assigned fails to communicate, e.g., transmit, for a predetermined time interval, for example, one or more frames. The time-out interval also enables the network to preserve the radio resource assignment when there are short interruption or gaps in the communications of the wireless communications device, thus reducing the signaling that would be otherwise be required to request and assign a new radio resource to the wireless device. In addition, by enabling the network to dynamically select the radio resource time-out interval, the network may adjust the capacity reserved for the wireless device based on loading conditions and/or quality of service considerations, as suggested above. For example, in heavy loading situations, or when the channel is changing rapidly, the duration of the grant time-out may be reduced. And in lightly loaded conditions, or where a higher quality of service is required, larger time-out intervals may be provided. Also, when the wireless communications device has knowledge of the time-out interval, the device may intelligently select transmission times within the window allowed to avoid deep fade, which will reduce power consumption.

The radio resource time-out interval of the instant disclosure may also complement existing and proposed radio resource assignment schemes. In FIG. 5, for example, the network sends rate control (RC) commands 522 on the forward link to adjust the data rate assigned at the time of the radio resource assignment.

While the present disclosure and what the best modes of the inventions have been described in a manner establishing possession thereof by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communications network, the method comprising:

transmitting a radio resource assignment to a wireless communications device;

transmitting radio resource assignment time-out information to the wireless communications device, the radio resource assignment time-out information having at least two states, a first state specifying a first duration during which the radio resource assignment to the wireless communications device remains valid after the wireless communications device discontinues communication on the radio resource assigned, a second state specifying a second duration during which the radio resource assignment to the wireless communications device remains valid after the wireless communications device discontinues communication on the radio resource assigned.

2. The method of claim 1, transmitting the radio resource assignment time-out information includes transmitting at least one bit specifying one of the first or second durations.

3. The method of claim 1, transmitting the radio resource assignment and the radio resource assignment time-out information in a single message.

4. The method of claim 1, indicating the time-out duration of the radio resource assignment to the wireless communications device in terms of frames.

5. The method of claim 1, selecting at least one of the first and second radio resource assignment time-out durations based on at least one of a wireless communications network load or a wireless communications network load variability.

6. The method of claim 1, selecting at least one of the first and second radio resource assignment durations based on at least one of reserve power of the wireless communications device or quality of service of the wireless communications device.

7. The method of claim 1, indicating with the first state that the first duration expires upon transmission of a specified number of frames, indicating with the second state that the second duration expires after an interval specified in another message.

8. A method in a wireless communications device, the method comprising:

receiving a radio resource assignment;

receiving radio resource assignment time-out information, the radio resource assignment time-out information indicating having first and second possible states, the first state indicating a first duration during which the radio resource assignment is valid after the wireless communications device discontinues communicating on the assigned radio resource, the second state indicating a second duration during which the radio resource assignment is valid after the wireless communications device discontinues communicating on the assigned radio resource.

9. The method of claim 8, receiving the radio resource assignment in response to a request, communicating on the radio resource assigned, discontinuing communication in the radio resource assigned, resuming communications on the radio resource assigned within the radio resource assignment time-out duration without requesting a new radio resource assignment.

10. The method of claim 9, resuming communications on the radio resource assigned at a data rate not greater than a data rate occurring when the communication was discontinued.

11. The method of claim 8,
receiving the radio resource assignment in response to a request,
communicating on the radio resource assigned,
discontinuing communications on the radio resource assigned,
requesting a new radio resource assignment if data communications are not resumed within the radio resource assignment time-out duration.

12. The method of claim 8, beginning the duration when the wireless communications device discontinues communication on the radio resource assigned.

13. The method of claim 8,
requesting the radio resource assignment,
receiving the radio resource assignment in response to the request, the radio resource assignment including a data channel assignment,
transmitting on the channel assigned,
discontinuing transmission on the channel assigned,
resuming transmission on the channel assigned within the radio resource assignment time-out duration without requesting a new radio resource assignment,
requesting a new radio resource assignment if transmission is not resumed on the channel assigned within the radio resource assignment time-out duration.

14. The method of claim 8, selecting transmission times based on the radio resource assignment time-out information.

15. The method claim 8, avoiding deep fade by selecting transmission times based on the radio resource assignment time-out information.

16. The method of claim 8,
indicating with the first state that the first duration expires upon transmission of a specified number of frames by the wireless communications device,
indicating with the second state that the second duration expires after an interval specified in another message received by the wireless communications device.

17. A message for transmission from a wireless communications network to a wireless communications device, the message comprising:
a radio resource time-out interval bit having at least a first state and a second state,
in the first state, the radio resource time-out interval bit specifying a first duration during which a radio resource assignment is valid after a wireless communications device to which the radio resource is assigned discontinues communicating on the assigned radio resource,
in the second state, the radio resource time-out interval bit specifying a second duration during which a radio resource assignment is valid after a wireless communications device to which the radio resource is assigned discontinues communicating on the assigned radio resource.

18. "The message of claim 17, the message is a radio resource assignment message including a channel assignment.

19. The message of claim 18, the radio resource assignment message includes a data rate assignment.

20. The message of claim 17,
in the first state, the first duration is a single frame,
in the second state, the second duration is a number of frames specified in another message.

* * * * *